Dec. 7, 1926.

F. HODGKINSON

TURBINE BLADING

Filed Jan. 24, 1924

1,610,009

WITNESSES:

F. Hodgkinson
INVENTOR

BY

ATTORNEY

Patented Dec. 7, 1926.

1,610,009

UNITED STATES PATENT OFFICE.

FRANCIS HODGKINSON, OF SWARTHMORE, PENNSYLVANIA, ASSIGNOR TO WESTINGHOUSE ELECTRIC AND MANUFACTURING COMPANY, A CORPORATION OF PENNSYLVANIA.

TURBINE BLADING.

Application filed January 24, 1924. Serial No. 688,296.

My invention relates to elastic-fluid turbines, more particularly to the means for securing blading therein, and has for an object to provide a holding means for blades disposed in an acute angular relation to the blade-carrying elements which shall securely hold the blades in place and prevent concentrated stresses due to blade vibration.

Another object of my invention is to provide apparatus of the character designated which shall be useful in securing turbine blades to a blade-carrying element of a frustro-conical shape.

Figure 1:
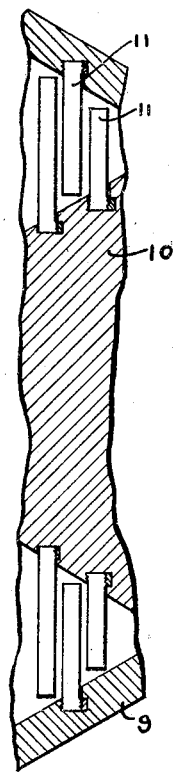
Figure 2:
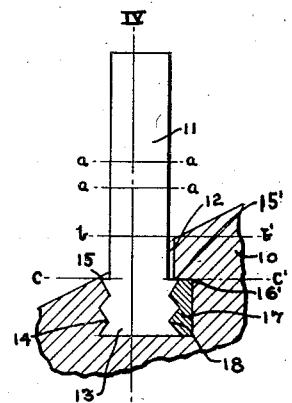
Figure 7:
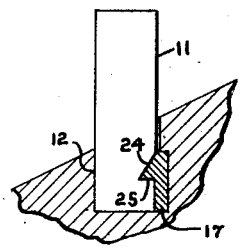
Figure 3:
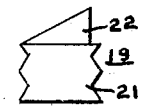
Figure 6:
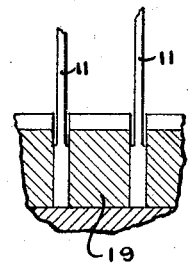
Figure 4:
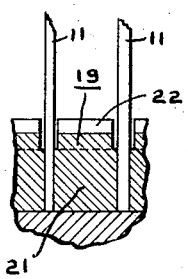
Figure 5:
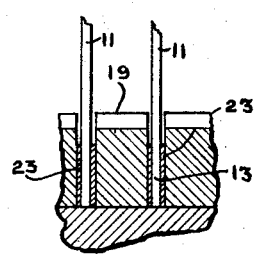

These and other objects are provided by apparatus illustrated in the accompanying drawing in which Fig. 1 is a fragmentary cross sectional view through a turbine having a rotor and a stator each of a frustro-conical shape and having rows of blades secured in accordance with my invention; Fig. 2 is a cross section of a fragment of a blade-carrying element embodying features of my invention; Fig. 3 is an elevation of a spacing element inserted betwen the blades in a row; Fig. 4 is a cross sectional view along the line IV—IV of Fig. 2; Figs. 5 and 6 are cross sectional views along the same line as Fig. 4, showing modified means of spacing the blades as employed in my invention, and Fig. 7 is a view similar to Fig. 1 showing a further modified form of my invention.

Hitherto in securing turbine blades to the blade-carrying element, where it became necessary or desirable to dispose the blades in an acute angular relation to the surface of the blade-carrying element, the root portions of the blades have been entirely engaged on both sides up to the surface of the blade-carrying element, defining a holding area for the blades, the boundary of which was in an acute angular relation to the longitudinal axis of the blade. When secured in this manner, the vibrations of the blades in operation have caused concentrated stresses to occur in the blade structure near the root portions thereof resulting in fracture.

To overcome this difficulty I have provided, at the root portions of the blades a holding area, the boundary of which, adjacent the surface of the blade-carrying element, is normal to the longitudinal axes of the blades. Above this boundary the blades are free to vibrate. This is provided for, in part, by enlarging the slot portion of the blade-carrying element above the holding area, by providing the spacing pieces between the blades with a reduced portion above said boundary, and by providing packing means at the roots of the blades below the boundary aforesaid.

Referring now to the drawings for a better understanding of my invention, 9 represents a stator and 10 a rotor of a turbine, each of a frustro-conical shape and carrying blades 11—11 secured in accordance with my invention. As illustrated, the blades are disposed in an acute angular relation to the surface of the blade-carrying element, either rotor or stator, or normal to the axis of the cone of which the blade-carrying element is a part.

Assume now for the purpose of illustration that the blade 11 shown in Fig. 2 is firmly secured in the blade-carrying element 10 up to the surface thereof. It is plain that the blade tends to vibrate about its least radius of gyration which will be in some plane normal to the longitudinal axis of the blade. Because of the angular relation between the blade and the blade-carrying element, the fit of the blade at the surface of this element is in a plane in an acute angular relation to the blade axis. When the blade vibrates in operation, flexure occurs on lines such as $a$—$a$. The blade also tends to bend along the line $c$—$c'$. Assuming that the blading is held rigidly at $b'$, while from $b$ to $c'$ it is not held, there is also a flexure between $b$ and $c$. This causes, if the blade were held in the manner assumed, a concentrated stress at $b'$ probably resulting in fracture starting at this point.

To overcome the aforementioned difficulty I provide in the blade-carrying element Fig. 2, either rotor or stator, a relatively wide slot 12 which leaves the blade free to vibrate above the line $c$—$c'$, defining the boundary between the held portion and the free portion of the blade 11. It will be noted that this line is normal to the longitudinal axis of the blade. While the line $c$—$c'$ is shown as extending from the surface of the blade-carrying element on one side across the face of the blade 11, it is evident that it might lie in any plane so long as it is perpendicular to the longitudinal axis of the blade.

The blade 11 has a root portion 13 fitting into the slot 12, said root portion being provided at its sides with serrations 15 and 15'. The slot 12 is provided on one side with serrations 14 into which the serrations 15 of the root portion of the blade 11 fit. The other side of the slot 12 is provided with an undercut groove or recess 16 into which is driven a packing piece 17 between the side of the recess and the root portion 13 of the blade, said packing piece being provided on one side with serrations 18 fitting the serrations 15' of the root portion 13 of the blade. The packing piece 17 is made of soft metal so that when driven in the groove 16, it firmly engages the blade in the slot.

Between the blades is inserted a spacing element 19 having a portion 21 conforming in shape to the root portion 13 of the blade 11 and having a portion 22 reduced in section, so as not to engage the blade, conforming in contour to the surface of the blade-carrying element. This latter portion is provided in order to complete the blade passages and avoid pockets therein between the blades. It will be noted that the portion 21 is provided at its sides with serrations similar to those described for the root portion 13 of the blade. These serrations fit on one side into the serrations of the slot 12 and on the other side into those of the packing piece 17. The packing piece 17, therefore, serves to secure both the root portion 13 of the blade and the portion 21 of the spacing element 19 firmly in the slot 12.

While I have indicated the packing piece 19 as being reduced in cross section above the line c—c' so as not to engage the blade 11 above that line, this may also be accomplished by the insertion of sheet metal strips 23—23 along the sides of the spacing elements 19 as shown in Fig. 5, or by enlarging the root portion of the blade 11 as shown in Fig. 6, the object being to leave the blade free to vibrate above the line defining the boundary of the holding area.

A simplified way of carrying out my invention is illustrated in Fig. 7 which may be desirable for securing blades which are not subjected to centrifugal stresses, such as those in the stator of the turbine. In this modification, the slot 12 and the root portion 13 of the blade 11 are made straight on one side instead of having the serrations 14 and 15 as illustrated in Fig. 2. The opposite side of the slot 12 is formed in the same manner as illustrated in Fig. 2. The root portion of the blade 13 is provided with one or more serrations 24 into which fit corresponding serrations 25 of the packing pieces 17. Where it is possible to use this modification, the manufacture thereof and the insertion of the blades in the blade-carrying element is much simplified.

From the foregoing, it is apparent that I have provided securing means for turbine blades which are disposed in an acute angular relation to a blade carrying element which is effective to securely hold the blades in place and to prevent concentrated stresses due to blade vibrations.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specially set forth in the appended claims.

What I claim is:

1. In a turbine, a blade disposed in an acute angular relation to the surface of a blade-carrying element and means for rigidly securing the blade to the blade-carrying element, said securing means defining an area the outward boundary of which adjacent to the surface of the blade-carrying element lies substantially in a plane normal to the longitudinal axis of the blade.

2. In a turbine, the combination of a blade-carrying element, a blade disposed in an acute angular relation to the surface of said blade-carrying element, said blade-carrying element having a slot and said blade having a root portion inserted into the slot, and means rigidly securing the blade in the slot, the boundary of said securing means adjacent to the free portion of the blade lying substantially in a plane normal to the longitudinal axis of the blade.

3. In a turbine, a blade-carrying member, a blade projecting therefrom at an angle other than normal to the surface of said member at the point of emergence, and blade-clamping means for attaching said blade to said member, said blade-clamping means engaging the root of said blade outwardly to a plane substantially normal to the longitudinal axis of said blade.

4. In a turbine, a blade-carrying member, a blade projecting therefrom at an angle other than normal to the surface of said member at the point of emergence, and blade-clamping means for attaching said blade to said member, said blade-clamping means engaging the root of said blade outwardly to a plane substantially normal to the longitudinal axis of said blade at the point of first emergence of said blade from said member.

5. In a turbine, the combination of a blade-carrying element having a slot for holding a row of blades, a row of blades having root portions within said slot, said blades being disposed in an acute angular relation to the surface of the blade-carrying element, and securing means at the roots of the blades, said securing means defining a holding area for the blades, the boundry of which adjacent to the free portion of the blade lying substantially in a plane normal to the longitudinal axes of the blades.

6. In a turbine, the combination of a blade-carrying element having a slot for the holding of blades, a row of blades fitting into the slot, said blades being in an acute angular relation to the surface of the blade-carrying element, spacing elements between adjacent blades, and packing elements at the sides of the blades and spacing elements for rigidly securing said blades and spacing elements within the slots, said spacing elements and packing elements defining a holding area at the roots of the blades, the boundary of which adjacent the free portion of the blades lies in a plane substantially normal to the longitudinal axes of the blades.

7. In a turbine, the combination of a frustro-conical shaped blade-carrying element having slots with undercut grooves, rows of blades having root portions fitting into the slots, said blades being disposed normal to the axis of the blade-carrying element, spacing elements within the slots between the blades in a row, and packing pieces between the sides of the grooves, the root portions and the spacing elements for firmly securing the root portions and the spacing pieces in the slots, the force exerted by said packing elements being in a direction substantially normal to the blade axes, the outward boundary of engagement of said packing pieces with said blade-root portions and spacing elements and the outward boundary of engagement of said blade-root portions and spacing elements at the opposite side of the row being equally distant from the axis of the blade-carrying element.

8. In a turbine, the combination of a frustro-conical shaped blade-carrying element having a slot, a row of blades having root portions fitting into the slot, said blades being disposed normal to the axis of the blade-carrying element, spacing elements within the slot between adjacent blades, said spacing elements conforming in contour to the surface of the blade-carrying element and having a portion engaging with each adjacent blade, the outward boundary of such engagement being substantially normal to the axis of the blade.

9. In a turbine, the combination of a blade-carrying element of a frustro-conical shape, said blade-carrying element having slots with undercut grooves, blades having root portions fitting into the slots, said blades being disposed normal to the axis of the blade-carrying element, and packing pieces engaging the root portion and the sides of the grooves, the force exerted by said packing pieces being in a direction substantially normal to the longitudinal axes of the blades, the outward boundary of engagement of said packing pieces with said blade-root portions and the outward boundary of engagement of said blade-root portions at the opposite side of the blades being equally distant from the axis of the blade-carrying element.

10. In a turbine, the combination of a blade-carrying element of frustro-conical shape, said blade-carrying element having annular slots with undercut grooves, rows of blades disposed in an acute angular relation to the surface of the blade-carrying element and having root portions fitting into the slots, spacing pieces in the slots between the blades in a row, packing elements for securing the blades and the spacing elements in the slots, said spacing elements conforming in contour to the surface of the blade-carrying element, said spacing pieces engaging with adjacent blades along areas the outward boundaries of which across the surfaces of the blades are substantially normal to the longitudinal axes thereof.

11. In a turbine, the combination of a frustro-conically shaped blade-carrying element having a slot with an undercut groove, a row of blades disposed in an acute angular relation to the surface of the blade-carrying element having root portions with serrated sides fitting into the slot, packing pieces having serrations fitting the serrations of the root portions, said packing pieces firmly engaging the sides of the root portions and the groove, the force exerted by said packing pieces being in a direction normal to the blade axes, each blade-root portion being engaged on opposite sides of the row outwardly to a plane substantially normal to the longitudinal axis of the blade.

12. In a turbine, the combination of a frustro-conically shaped blade-carrying element having a slot with a serrated side and an undercut groove, a row of blades having root portions with serrated sides fitting into the slot, spacing elements having serrated sides in the slot between adjacent blades, said spacing elements conforming in contour to the surface of the blade-carrying element and having means for engaging a portion thereof with adjacent blades, and packing pieces inserted in the groove, said packing pieces having serrations fitting the serrations of the blades and the spacing elements and firmly engaging the sides of the blade, the spacing elements and the groove; the side of the slot, the engaging portions of the spacing elements and the packing pieces defining a holding area for the blades, the outward boundary of which is in a plane substantially normal to the longitudinal axes of the blades.

13. In a turbine, the combination of a blade-carrying element having a slot, a row of blades having root-portions fitting into the slot, said blades being disposed at an acute angle to the surface of the blade-carrying element, the free portion of each blade meeting the held portion entirely in a plane substantially normal to the axis of the blade.

14. In a turbine, the combination of a blade-carrying element having a slot, a row of blades having root-portions fitting into the slot and being disposed at an acute angle to the surface of the blade-carrying element, and spacing elements within the slot between adjacent blades and having portions engaging the blade root-portions, the outer boundary of such engagement of each blade with adjacent spacing elements being substantially in a plane normal to the axis of the blade.

15. The combination defined in claim 14 wherein each blade is held, on sides not adjacent the spacing elements, outwardly to a plane normal to the axis of the blade.

16. In a turbine the combination of a blade-carrying element having a frusto-conical surface and a slot therein for holding a row of blades, a row of blades having root-portions within said slot, said blades being disposed normal to the axis of said surface, securing means on opposite sides of the row engaging the root-portions outwardly to equal distances from the axis of said frusto-conical surface.

17. The combination defined in claim 16 wherein the inner boundaries of the passages between the blades are continuous with the frusto-conical surface.

In testimony whereof, I have hereunto subscribed my name this 14th day of January, 1924.

FRANCIS HODGKINSON.